US006807858B2

(12) United States Patent
Orsier

(10) Patent No.: US 6,807,858 B2
(45) Date of Patent: Oct. 26, 2004

(54) VIBRATING STRUCTURE COMPRISING TWO COUPLED OSCILLATORS, IN PARTICULAR FOR A GYRO

(75) Inventor: Elisabeth Orsier, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/257,989

(22) PCT Filed: May 15, 2001

(86) PCT No.: PCT/FR01/01466
§ 371 (c)(1),
(2), (4) Date: Oct. 30, 2002

(87) PCT Pub. No.: WO01/88478
PCT Pub. Date: Nov. 22, 2001

(65) Prior Publication Data
US 2003/0101815 A1 Jun. 5, 2003

(30) Foreign Application Priority Data
May 16, 2000 (FR) .......................................... 00 06202

(51) Int. Cl.[7] .............................................. G01N 9/04
(52) U.S. Cl. .................. 73/504.12; 73/504.14
(58) Field of Search ................ 73/504.12, 504.14, 73/504.13, 504.15, 506.16, 506.09, 514.22, 514.23

(56) References Cited

U.S. PATENT DOCUMENTS

| 5,241,861 | A | | 9/1993 | Hulsing, II | 73/505 |
| 5,911,156 | A | * | 6/1999 | Ward et al. | 73/504.16 |
| 6,122,961 | A | * | 9/2000 | Geen et al. | 73/504.12 |
| 6,250,156 | B1 | * | 6/2001 | Seshia et al. | 73/504.12 |
| 6,257,057 | B1 | * | 7/2001 | Hulsing, II | 73/504.04 |
| 6,474,160 | B1 | * | 11/2002 | Stewart et al. | 73/504.04 |
| 6,481,284 | B2 | * | 11/2002 | Geen et al. | 73/504.12 |
| 6,505,512 | B2 | * | 1/2003 | Geen et al. | 73/504.14 |

FOREIGN PATENT DOCUMENTS

WO    96 39614    12/1996

* cited by examiner

*Primary Examiner*—Hezron Williams
*Assistant Examiner*—Jacques M. Saint-Surin
(74) *Attorney, Agent, or Firm*—Oblon, Spivak, McClelland, Maier & Neustadt, P.C.

(57) ABSTRACT

A vibrating structure including at least two oscillators vibrating in a direction of oscillation included in a plane, a rigid support of the oscillators, and an oscillator coupling device to couple their vibratory movements. The coupling device is connected to the rigid support and to the oscillators. Each oscillator includes at least one mass and at least one flexible arm connecting the mass to the coupling device. The coupling device includes flexible attachment mechanisms associated with at least one flexible arm of each oscillator by at least one point of attachment, making a pivot at the point of attachment.

10 Claims, 3 Drawing Sheets

VIBRATING STRUCTURE COMPRISING TWO COUPLED OSCILLATORS, IN PARTICULAR FOR A GYRO

BACKGROUND OF THE INVENTION

1. Field of the Invention

The present invention is directed to a vibrating structure that may be manufactured in one piece by the techniques of a micro-machining. The vibrating structure has oscillating masses whose displacement indicates Coriolis forces of a capacitive rate gyro.

2. Description of the Related Art

A common application of vibrating structures of this kind is to act as a sensitive component for a capacitive rate gyro. They include two masses which vibrate in a common plane and a same direction, but in phase opposition, and which are connected by flexible beams or strips to a more rigid portion of the structure. Applying an alternating electric field between the masses and fixed portions of the structure adjacent to them causes the masses to oscillate. If the structure is subject to a rotational movement around an axis perpendicular to the direction of oscillation but belonging to the plane of oscillation, the Coriolis forces are expressed as displacements of the masses. The masses are displaced in a direction perpendicular to the axis of rotation, and at a distance proportionate to the speed of rotation in a direction perpendicular to the plane of oscillation. These displacements may be addressed if the masses and the adjacent and fixed portions of the structure, located in the direction of displacement, are constructed as a capacitor, since they may be correlated with variations in capacity, which can be easily measured.

One problem encountered with vibrating structures of this kind arises from machining inaccuracies, from unavoidable dissymmetries between the masses, from the influence of their attachment components, from the residual constraints which make it difficult to give them exactly the same inherent frequency, and to impose on them displacements which are exactly in phase opposition. It is for this reason that the document WO 96 39614 discloses a vibrating structure of this kind, wherein the masses are connected to each other by a coupling system including, on each side, a flexible arc-shaped beam and a beam parallel to the direction of oscillation, the ends of which are fixed to the rigid part of the structure and the middle of which is joined to the top of the arc-shaped beam. The oscillations produce distortions of these coupling beams, but movements in phase opposition produce a symmetrical distortion which, in respect of this particular embodiment, distorts the coupling beams in a more straightforward way and absorbing less energy than would be the case for displacements of the masses which are equal but in phase. The coupling system, more flexible in respect of displacements in phase opposition, therefore favours the latter.

Criticisms may be made of this design in respect of the dissymmetrical shape of the beams holding the masses, the sensitivity of the system to inaccuracies of machining causing dissymmetries between the masses, less freedom of choice for the geometries of the different beams of the proposed coupling system compared to the invention presented here. This design also imposes a way of fixing the device, by anchorages, which is not as favourable to the displacement of the masses under the Coriolis force as the example of the proposed invention makes possible, and is not therefore as favourable to a high sensitivity of measurement.

SUMMARY OF THE INVENTION

The present invention makes it possible to offer a better solution in these respects, and allows two oscillators to be coupled at the required phase difference.

In its most general form, the invention relates to a vibrating structure, including at least two oscillators vibrating in a direction of oscillation included in a plane, a rigid support of the oscillators and oscillator coupling means able to couple their vibratory movements, these means being connected, on the one hand to the rigid support and on the other hand to the oscillators, each oscillator comprising at least one mass and at least one flexible arm connecting the mass to the coupling means, characterised in that said coupling means comprise flexible attachment means connected to the rigid support and to at least one flexible arm of each oscillator by at least one point of attachment, making at said point of attachment a pivot.

To advantage, the coupling means are all or partly located within the rigid support.

In a preferred embodiment, the coupling means of two of the oscillators comprise at least one coupling unit formed by means of attaching each oscillator to the rigid support, and beams allowing the attachment means to be connected to the rigid support while providing a transfer of movement from at least one of the pivots of one oscillator to at least one of the pivots of the other of said two oscillators.

Frequently, the structure comprises two coupling units, each unit connecting symmetrically all the oscillators of the structure.

In a particular construction, the beams of the coupling means include at least two intermediate beams extending ends of the arms and a median beam connecting the intermediate beams to each other; it is then possible for the intermediate beams to be oblique to the median beam.

BRIEF DESCRIPTION OF THE DRAWINGS

The invention will now be described in more detail using the following figures, which well help to bring out its characteristics, features and advantages.

DETAILED DESCRIPTION OF THE INVENTION

Figure 1:
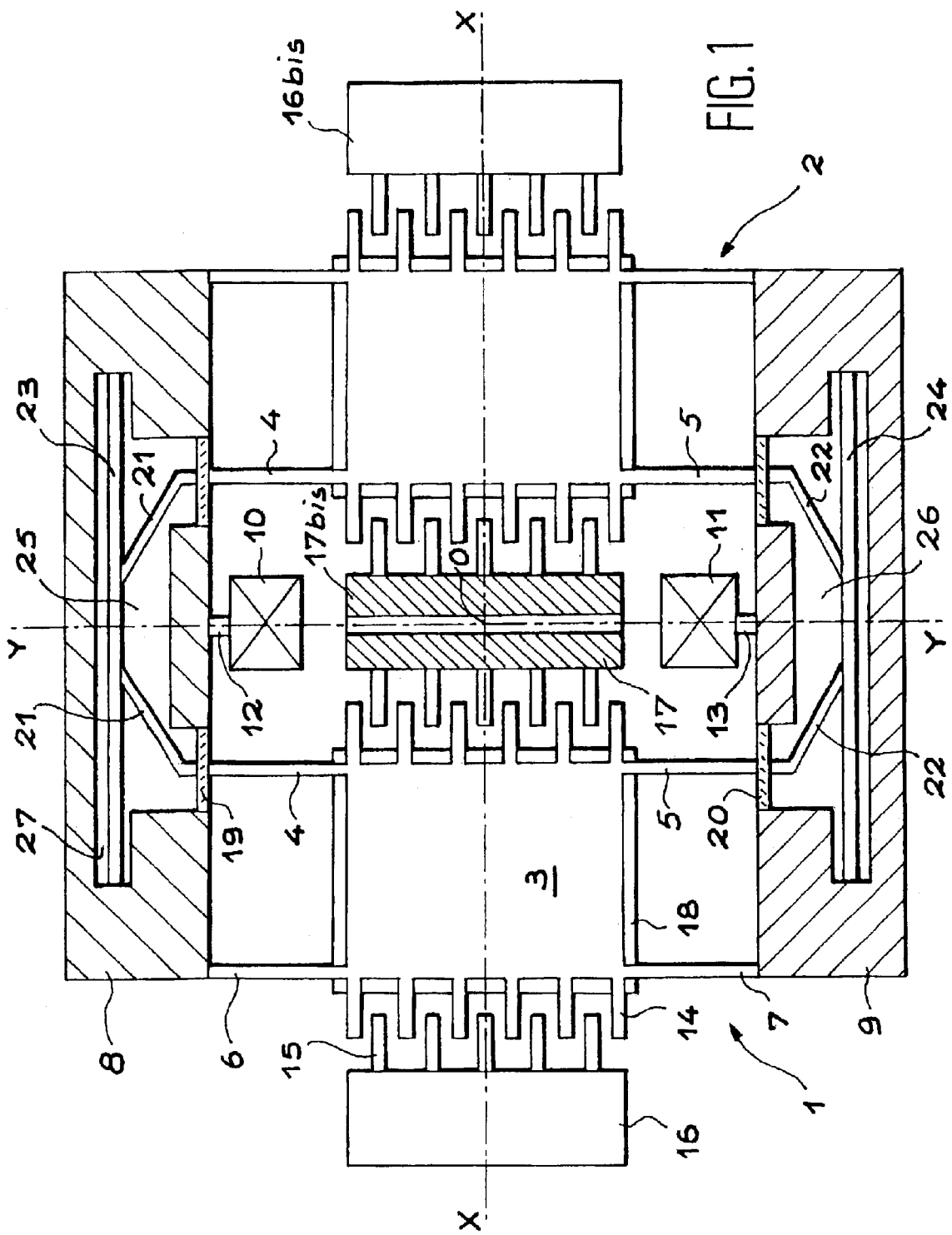
FIG. 1 is the general view of one embodiment of the invention, seen in a direction perpendicular to the plane of oscillation.

In the embodiment example in FIG. 1, the coupling means include flexible attachment means constituted by four beams 19, 20 respectively associated with four flexible arms 4,5; the point of attachment of each beam to each of the arms forming a pivot.

The coupling means additionally include in this embodiment two units of two intermediate beams 21, 22 and one median beam 23, 24 connecting the attachment means 19, 20 respectively to the rigid support while providing a transfer of movement from one of the pivots to the other of the same unit.

Referring to FIG. 1, it may be seen that the structure allows two axes of symmetry, the axis seen horizontal XOX being the axis of oscillation and the axis seen vertical YOY being the axis of rotation of the structure in the event of the latter being a rate gyro.

Two oscillators 1 and 2 may be found each of which includes a central mass 3 connected by a pair of flexible arms 4 and 5 in extension in the axis YOY (and in this case by a second pair of flexible arms 6 and 7 also in extension and parallel to the previous ones) to rigid support components 8 and 9 of the structure the rigidity level of which is very high relative to that of the arms 4, 5, 6 and 7. Forming a rigid support of the arms 4 to 7, the rigid support 8 and 9 is suspended from anchor points 10 and 11 of an underlying substrate by attachments 12 and 13. The attachments 12 and 13, located on the axis YOY, allow the rigid support 8 and 9 to pivot around this axis. The components described heretofore are, generally speaking, conductors. The masses 3 are covered with mobile electrodes 14 extending in the direction XOX and into the partings of which penetrate fixed electrodes 15, of a motor 16, 16B or of a displacement sensor 17, 17B: the electrodes 14 and 15, forming interdigital combs allow electrostatic forces and accelerations to be imposed on the masses 3; vibrations are produced by alternating attractive forces between the motors 16 and the masses 3; the sensor 17 allows the displacement of the masses 3 to be measured according to the variations in capacity of the capacitor formed between the electrodes 14 and 15. In this case, the motors 16 and 16B are on the outer sides of the oscillators 2 and the sensors 17 and 17B are placed between them but the reverse would be possible. The sensors 17 and 17B could be common. In the reverse case of the motors 16 and 16B being placed in the centre, they could also be common. It is possible for the sensors 17 and 17B not to be used or also to be used as a motor. In this case a significant potential difference, applied between the electrodes 14 and 15 of the motors 16 and 16B for a half-life of the oscillation of the masses 3, causes the masses 3 to oscillate. The sensors 17 and 17B may also be used as a motor. In this case a significant potential difference is applied between the electrodes 14 and 15 for the other half-life of the oscillation of the masses 3. This is not mandatory since the spring effect of the arms 4, 5, 6, 7 also intervenes in the oscillation of the masses 3. Motors of another type (electromagnetic, piezoelectric, etc.) are conceivable.

The movements of attraction between the electrodes 14 and 15, which make the masses 3 oscillate on the axis XOX by bending the arms 4, 5, 6 and 7 the stiffness level of which is low, may be controlled at any frequency and any phase difference. In the case of a rate gyro, the movements of the masses 3 are in phase opposition and the displacements of the masses 3 are measured in the direction perpendicular to the figure in order to deduce from them the speed of rotation around the axis YOY to which the structure is subject; conducting surfaces 18 are established on the underlying substrate for example underneath the masses 3 in order to measure the corresponding variations in capacity.

The provisions that follow are more specific to the invention. The arms 4 and 5 are not fixed directly to the rigid support 8 and 9, but by using attachment means, composed of attachment beams 19 and 20, which are perpendicular to them (oriented in the axis XOX), flexible but not necessarily rectilinear: curved shapes are possible. The arms 4 and 5 are extended beyond the attachment beams 19 and 20 by intermediate beams 21 and 22 which end up meeting respective median beams 23 and 24, themselves flexible, oriented in the axis XOX and the ends of which are fixed to the rigid support 8 and 9. Each median beam 23 or 24 connects one pair of the intermediate beams 21 and 22 and forms with them an interconnection of pairs of arms 4 and 5 of the two oscillators 1 and 2. The beams 19, 21 and 23 like 20, 22 and 24 are provided in cutouts 25 and 26 of the rigid support 8 and 9, and these cutouts may have extensions 27 in order to increase the length of the median beams 23 and 24 and therefore their flexibility. More generally, the cutouts 25 and 26 may have any shape and any appropriate size.

Figure 2:
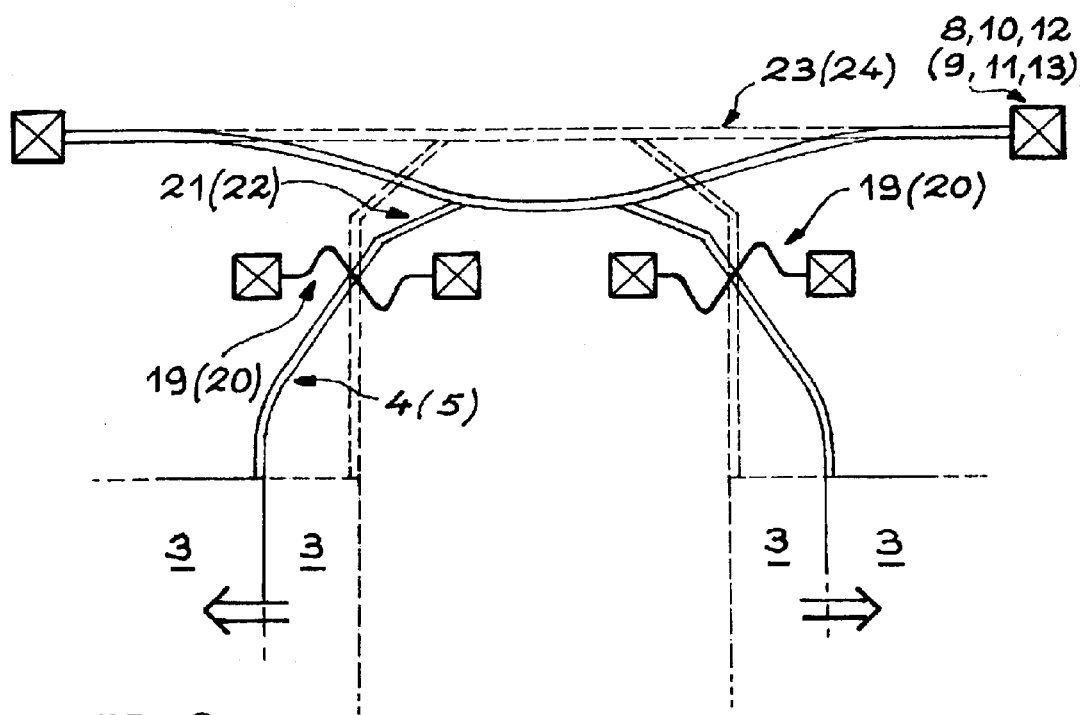
FIGS. 2, 3, 4, 5 and 6 illustrate a number of variants of the coupling system.

The attachment beams 19 and 20 lend themselves to distortions, which lead to the arms 4 and 5 behaving approximately as if they were mounted on the rigid support 8 and 9 by means of pivots, i.e., the attachment beams 19 and 20 inhibit the arms 4 and 5 from moving in a direction transverse to the plane of the rigid supports 8 and 9. FIG. 2 shows, by exaggerating them, the distortions observed during one moment of an oscillation of the masses 3 in phase opposition. The masses 3 are separating, the arms 4 and 5 bend and cause bending of the attachment beams 19 and 20, which remain in this example perpendicular in the vicinity of the attachment joints of the arms 4 and 5 to which they are fixed. Bending is also caused on the median beams 23 and 24, the centres of which move closer together and further apart alternately. The bending of the median beams 23 and 24 is simple in form, with a single central bulge, which therefore absorbs moderate distortion energy. If movements not exactly in phase opposition were imposed, they would produce distortions of a more complex form on the median beams. The median beams of the FIGS. 1 and 2 are therefore stiffer with regard to these movements and let them appear less easily.

Figure 3:
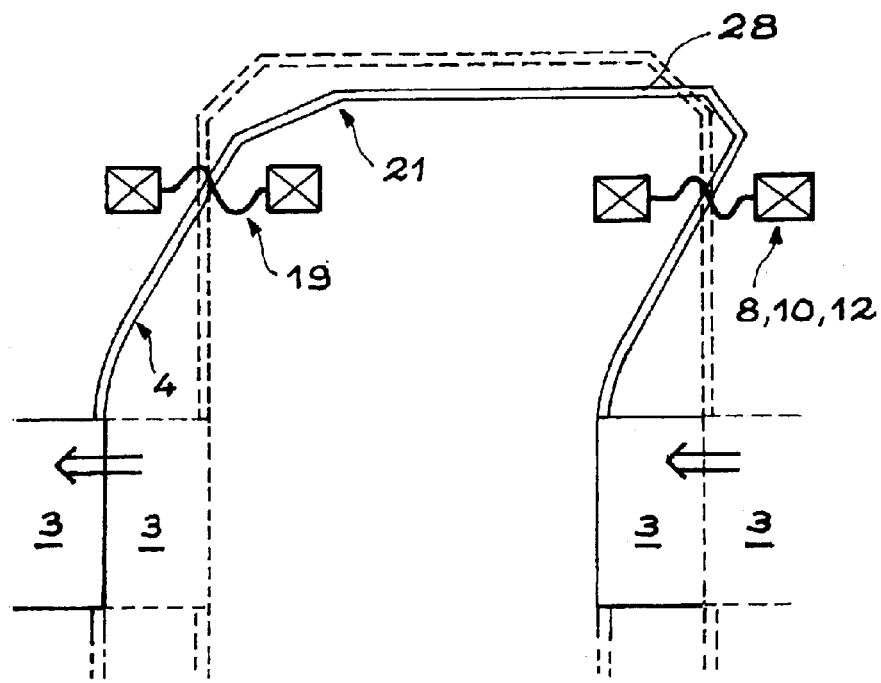

FIG. 3 shows another situation, in which the median beams 23 and 24 connected by their ends to the rigid support 8 and 9 are replaced by median beams 28 meeting the intermediate beams 21 and 22, with no contact with the rigid support 8 and 9: the distortion of the system of beams is then less for in phase movements, since the median means 28 are almost not distorted. Such a system will therefore be more sensitive to the excitations producing such movements, and may be preferred in respect of applications other than rate gyros.

Examples of embodiments have been shown, in which the masses 3 are connected, by their two sides, to the rigid support 8 and 9 by beams and assembly arms (beams+arms, 4, 6, 19, 21, 23, etc. and 5, 7, 20, 22, 24, etc.) which are symmetrical, but this is not indispensable; indeed, the beams and assembly arms could be different, or even provided with a single side.

Figure 4:
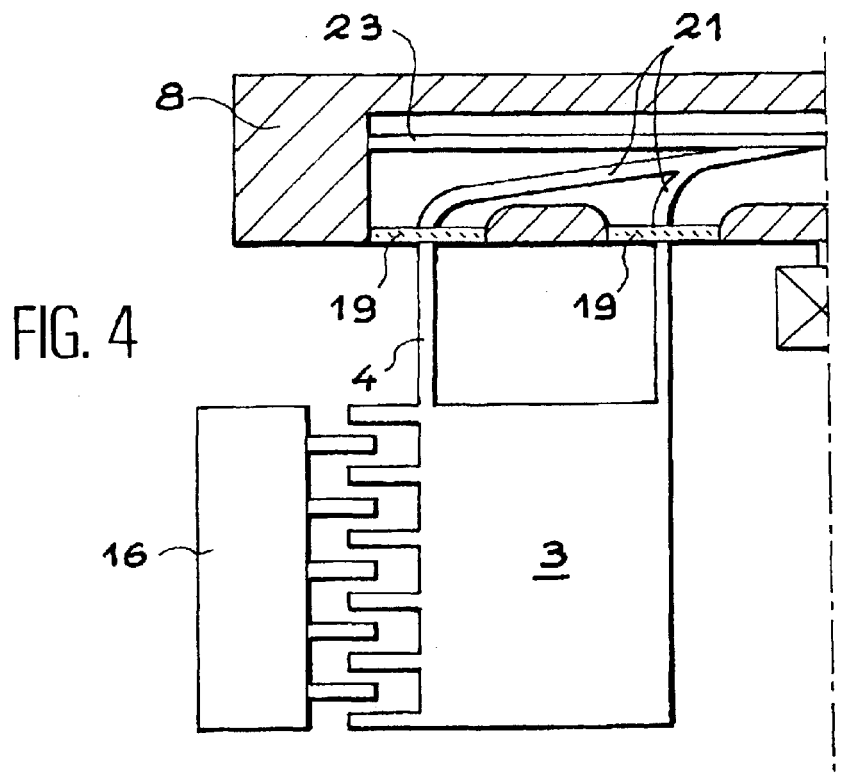
Figure 5:
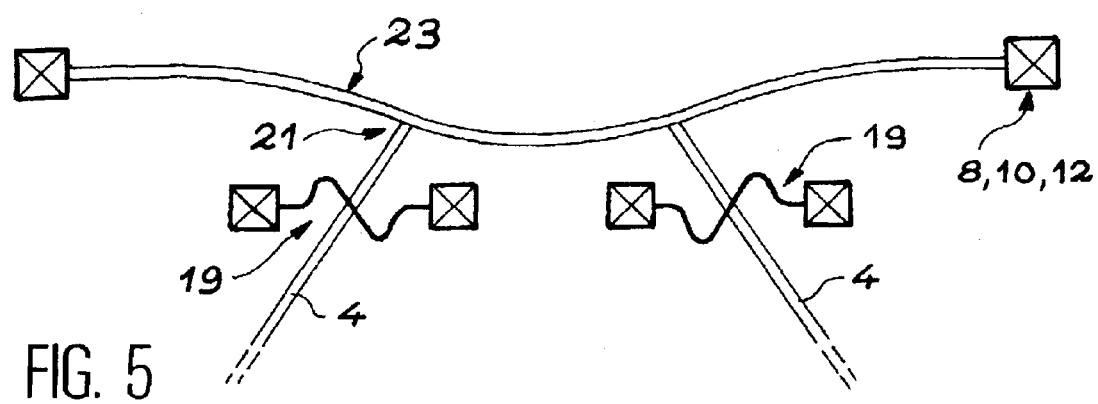
Figure 6:
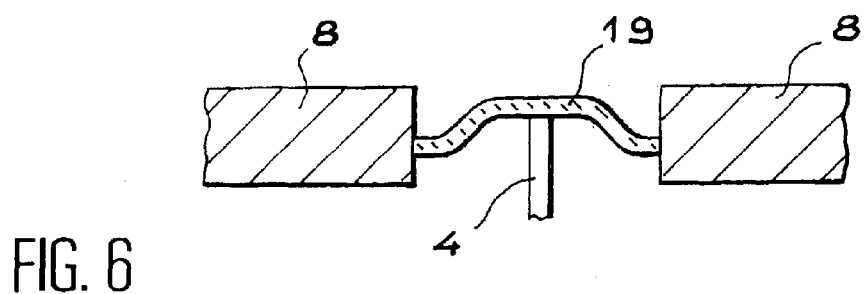

FIGS. 4, 5 and 6 shows some embodiment variants. FIG. 4 shows that the masses 3 may be connected to the rigid support 8 or 9 by several arms 4 connected to as many attachment beams 19 each forming a pivot according to the principle already explained; the arms 4 are extended by respective intermediate beams 21 which are connected to the median beam 23. In FIG. 5 it may be seen that the intermediate beam 21 extending the arms 4 supporting the masses 3 and extending between the attachment beams 19 and the median beam 23 are not necessarily oblique but may be aligned with the arms 4. Finally, FIG. 6 shows that the attachment beams 19 may be curved and more generally have any shape or orientation compatible with the quality of bending so as to function as a pivot.

What is claimed is:

1. A vibrating structure comprising:
   a rigid support;
   two oscillators, each including:
       a mass oscillating along a direction of oscillation contained within a plane of oscillation;
       flexible arms connected to the mass; and
       flexible means for attaching the flexible arms to the rigid support; and
   means for coupling the two masses by connecting respective ones of the flexible means for attaching, wherein the flexible means for attaching are connected to the flexible arms and the means for coupling at pivot zones, and the flexible means for attaching inhibit movement of the masses in a direction having a component transverse to the plane of oscillation.

2. The vibrating structure of claim 1, wherein the flexible means for attaching inhibit movement of the masses in a direction having a component transverse to the direction oscillation.

3. The vibrating structure of claim 1, wherein the flexible means for attaching include flexible beams perpendicular to the flexible arms, and wherein the means for coupling includes a median beam perpendicular to the flexible arms, and includes intermediate beams connecting the median beam to the flexible means for attaching.

4. The vibrating structure of claim 3, wherein the median beam is connected to the rigid support at ends of the median beam.

5. The vibrating structure of claim 1, wherein the means for coupling are provided in cutouts of the rigid support.

6. A vibrating structure, comprising:

two oscillators vibrating in a direction of oscillation included in a plane;

a rigid support of the two oscillators; and means for coupling vibratory movements of the two oscillators, the means for coupling connected to the rigid support and to the two oscillators, wherein each oscillator comprises a mass and a flexible arm connecting the mass to the means for coupling, wherein the means for coupling includes:

flexible means for attaching the rigid support and the flexible arm of each oscillator to a point of attachment, making a pivot at the point of attachment, a coupling unit formed by the flexible means for attaching and by beams allowing the flexible means for attaching to be connected to the rigid support while providing a transfer of movement from the pivot of a first of the oscillators to the pivot of a second of the oscillators, and wherein the beams of the coupling unit include two intermediate beams extending to ends of the flexible arms and a median beam connecting the two intermediate beams to each other.

7. The structure according to claim 6, wherein the intermediate beams are oblique relative to the median beam.

8. The structure according to claim , wherein the median beam extends beyond the intermediate beams and is fixed by ends to the rigid support.

9. The structure according to claim 8, wherein the means for coupling are arranged in a cutout of the rigid support.

10. The structure according to claim 9, wherein ends of the median beam extend in extensions of the cutout.

\* \* \* \* \*